United States Patent [19]
Schoenmeyr

[11] Patent Number: 5,816,133
[45] Date of Patent: Oct. 6, 1998

[54] COMPOSITE DIAPHRAGM FOR DIAPHRAGM PUMPS

[75] Inventor: Ivar Schoenmeyr, Mission Viejo, Calif.

[73] Assignee: Aquatec Water Systems, Inc., Anaheim, Calif.

[21] Appl. No.: 874,153

[22] Filed: Jun. 13, 1997

Related U.S. Application Data

[62] Division of Ser. No. 702,322, Aug. 23, 1996, which is a division of Ser. No. 511,908, Aug. 7, 1995.
[51] Int. Cl.$^6$ ..................................................... F01B 29/00
[52] U.S. Cl. .............................................. 92/128; 264/255
[58] Field of Search .................................. 264/250, 255, 264/267; 92/128, 96

[56] References Cited

U.S. PATENT DOCUMENTS

| | | | |
|---|---|---|---|
| 4,385,025 | 5/1983 | Salerno et al. | 264/255 |
| 4,640,272 | 2/1987 | Monett | 128/127 |
| 4,885,121 | 12/1989 | Patel | 264/255 |
| 5,073,321 | 12/1991 | Wheeler | 264/255 |
| 5,362,435 | 11/1994 | Volpe | 264/250 |

FOREIGN PATENT DOCUMENTS 5-220850 8/1993 Japan ..................................... 264/255

Primary Examiner—Thomas E. Denion
Attorney, Agent, or Firm—Blakely Sokoloff Taylor & Zafman

[57] ABSTRACT

A pump diaphragm that is composed of two different shore-hardness materials of the same base polymer. The diaphragm includes a strong layer that will withstand hydraulic pressures and one or more soft layers that can be shaped into desirable sealing configurations. The diaphragm is constructed by first injecting a first thermoplastic material, with a relatively lower percentage of rubber filler, into a mold cavity and allowing the first material to cure. The hardened first material is then placed into a second mold cavity. A second thermoplastic material which contains the same base polymer but a relatively higher percentage of rubber filler is then injected into the second cavity. The first and second material utilize the same base polymer and thus will have the same melt temperature, as well as a strong propensity to bond to each other when molten. The second material is introduced to the cavity at a temperature that melts the interface of the first material. As the second material and the interface hardness, the two layers have become chemically welded together. The second cavity gives shape to the sealing areas of the diaphragm.

3 Claims, 2 Drawing Sheets

COMPOSITE DIAPHRAGM FOR DIAPHRAGM PUMPS

This is a Divisional Application of application Ser. No. 08/702,322, filed Aug. 23, 1996, which is a Divisional Application of application Ser. No. 08/511,908, filed Aug. 7, 1995.

BACKGROUND OF THE INVENTION

1. Field of the Invention

The present invention relates to a diaphragm for a diaphragm pump.

2. Description of the Related Art

FIG. 1 shows a diaphragm pump that is used in reverse osmosis water purification systems. The diaphragm pump 10 contains a piston 12 that is reciprocated by a wobble plate assembly 14 within a pumping chamber 16 of the pump 10. The wobble plate is typically driven by an electric motor (not shown). The reciprocating movement of the piston 12 pumps water out of the pumping chamber 16 and through an outlet port of the pump 10. There are typically three separate pistons that move in synchronization to continuously pump water from the unit. The pistons 12 are attached to a diaphragm 18 which is captured by the outer shells 20 of the pump housing. The outer edge of the diaphragm 18 has a lip 22 which seals the pump housing.

The unsupported portion of diaphragm 18 must be strong enough to withstand the hydraulic pressure generated within the pumping chamber. At the same time, the diaphragm must be capable of flexing repeatedly without deteriorating.

Diaphragms have been produced utilizing thermosetting elastomeric materials cured around a reinforcement fiber mat. It was found that as the diaphragm flexed, the individual strands in the fabric weave would move against each other, eventually wearing to the point of failure. Thermoplastic materials were traditionally too stiff to flex sufficiently to be considered for diaphragms. However, by mixing a base plastic polymer with a certain amount of elastomeric filler, a "thermoplastic elastomer" can be generated with favorable flexing characteristics. Montasanto Co. has sold a thermoplastic elastomer under the trademark "Santoprene" which has found recent widespread use in the diaphragm industry.

On a macroscopic scale, the thermoplastic elastomer is relatively homogeneous, with the filler being equally blended into the material. The thermoplastic elastomer does not contain fiber strands that wear and fail in response to stress cycles. Although capable of flexing, the "plastic" component of the thermoplastic elastomer typically generates a substantially higher surface hardness than the elastomer (rubber) of the earlier used fabric reinforced elastomeric diaphragms. The harder surface creates undesirable sealing characteristics.

The hardness of the elastomer can be reduced by adding additional rubber to the composition. Unfortunately, the additional rubber also reduces the strength of the diaphragm. It would be desirable to provide a diaphragm that was strong, flexible and provided excellent sealing characteristics.

SUMMARY OF THE INVENTION

The present invention is a pump diaphragm that is composed of two different shore-hardness materials of the same base polymer. The diaphragm includes a strong layer that will withstand hydraulic pressures and one or more soft layers that can be shaped into desirable sealing configurations. The diaphragm is constructed by first injecting a first thermoplastic material, with a relatively low percentage of rubber filler, into a mold cavity and allowing the first material to cure. The first cavity gives shape to the flexing and general support area of the diaphragm. The hardened first material is then placed into a second mold cavity.

A second thermoplastic material, which contains the same base polymer but a relatively higher percentage of rubber filler, is then injected into the second cavity. The first and second material utilize the same base polymer and thus will have the same melt temperature, as well as a strong propensity to bond to each other when molten. The second material is introduced to the cavity at a temperature that melts the interface of the first material. As the second material and the interface hardness, the two layers have become chemically welded together. The second cavity gives shape to the sealing areas of the diaphragm. The resultant diaphragm has a strong homogeneous layer that will resist hydraulic pressures and a soft layer shaped into sealing lips that will readily contour and seal against mating surfaces.

BRIEF DESCRIPTION OF THE DRAWING

The objects and advantages of the present invention will become more readily apparent to those ordinarily skilled in the art after reviewing the following detailed description and accompanying drawings, wherein.

DETAILED DESCRIPTION OF THE INVENTION

Figure 1:
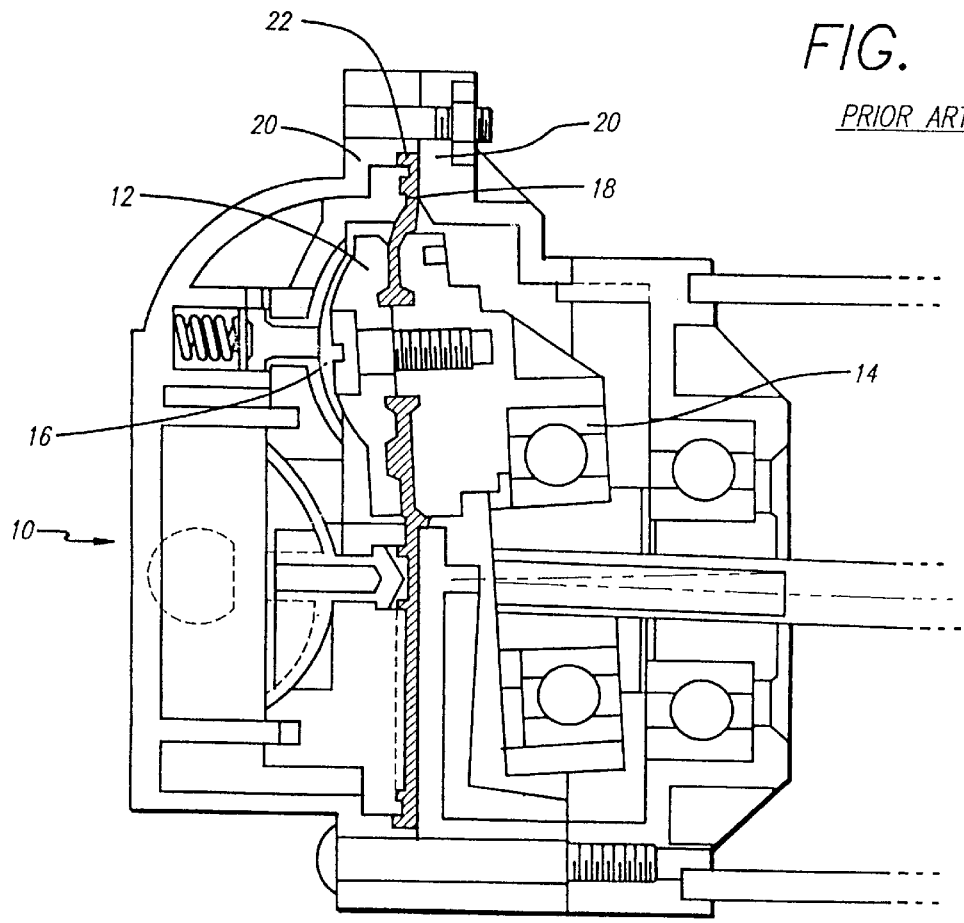
FIG. 1 is a cross-sectional view of a diaphragm pump of the prior art.
Figure 2:
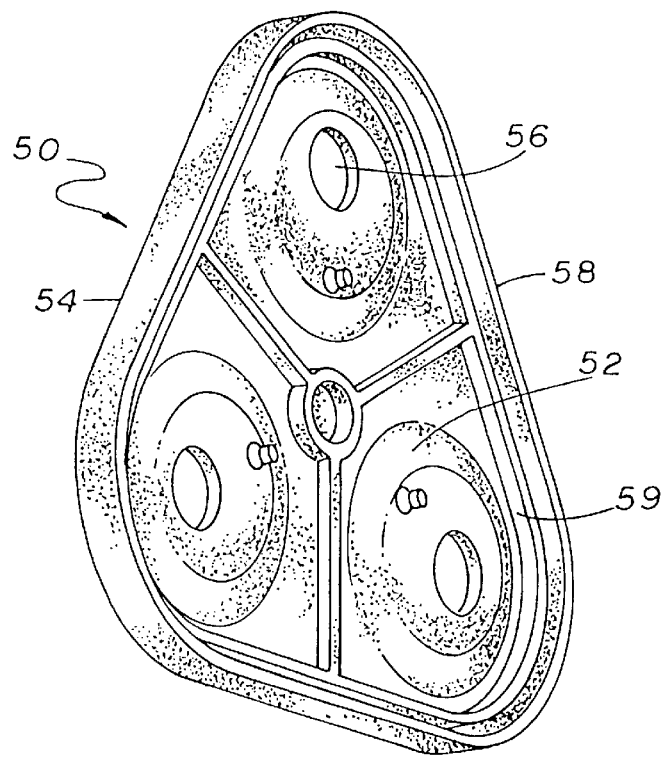
FIG. 2 is a perspective view of a diaphragm of the present invention.

Referring to the drawings more particularly by reference numbers, FIG. 2 shows a diaphragm 50 of the present invention. The diaphragm 50 has an flexing portion 52 and a sealing portion 54. The flexing portion 52 contains a plurality of apertures 56 that provide clearance holes for the pistons of a diaphragm pump. The sealing portion 54 has a pair of outer lips 58 and 59 that provide a sealing feature for the pump housing. The outer lips 58 and 59 have a shore number that is less than the shore number of the flexing portion 52. The outer lips 58 and 59 are therefore softer and have more desirable sealing characteristics than the flexing portion 52 of the diaphragm 50.

Figure 3:
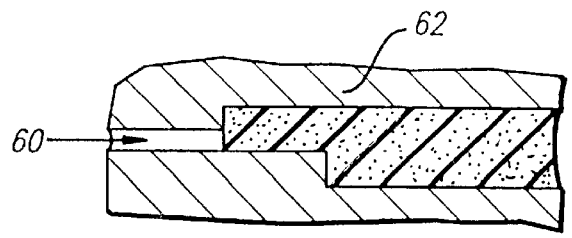
FIG. 3 is a sectional view of a mold being injected with a first thermoplastic materials.
Figure 4:
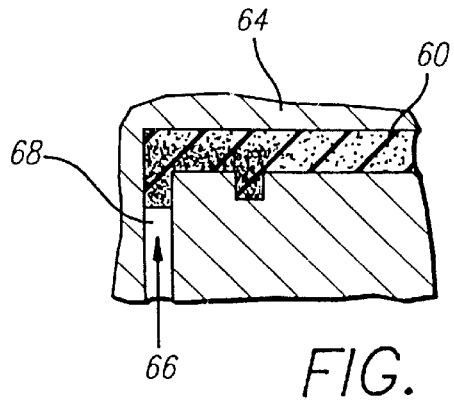
FIG. 4 is a cross-sectional view showing a second thermoplastic material being injected into a mold cavity that contains a hardened diaphragm insert.
Figure 5:
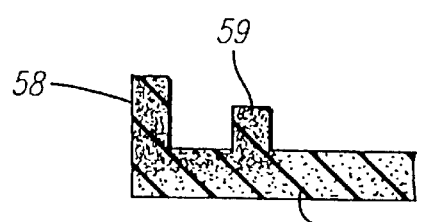
FIG. 5 is a cross-sectional view of a diaphragm of the present invention.
Figure 6:
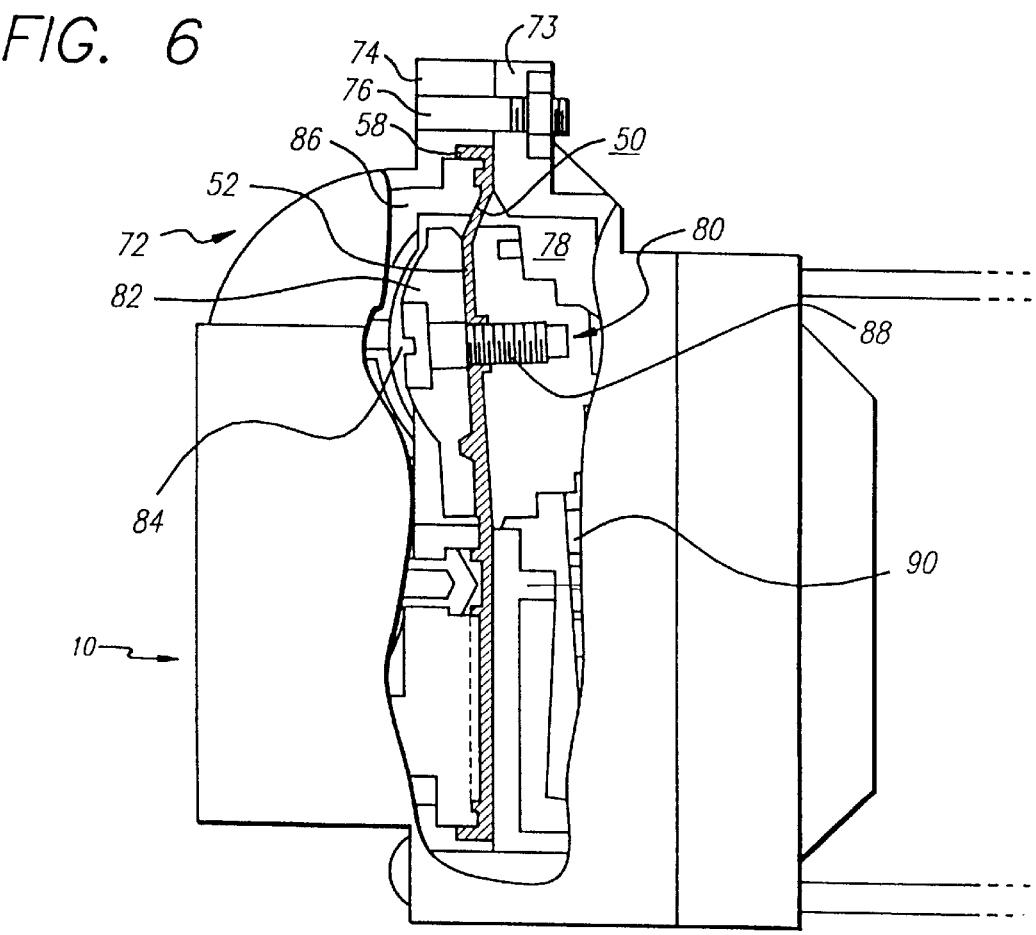
FIG. 6 is a cross-sectional view of the diaphragm assembled into a pump.

As shown in FIG. 3, the diaphragm 50 is preferably constructed by first injecting a first thermoplastic material 60 into the inner cavity of a first mold 62. As shown in FIG. 4, the first material is cured and placed into the inner cavity of a second mold 64. A second thermoplastic material 66 is then injected into the outer portion 68 of the second mold 64. The second material 66 is introduced to the mold cavity at a temperature above the melt temperature of the first material so that the interface 70 of the hardened first material becomes melted. As shown in FIG. 5, the first and second materials then harden as a single diaphragm.

In the preferred embodiment, both the first and second thermoplastic materials are an EPDM filled elastic polymer sold by Monsanto Co. under the trademark SANTOPRENE. Each thermoplastic material is filled with a different volume of EPDM filler to vary the shore number of the material. In the preferred embodiment, the first thermoplastic material is filled with EPDM so that the material has a shore number no less than 80A. The second thermoplastic material is filled with EPDM so that the material has a shore number no greater than 60A.

The first and second EPDM filled thermoplastic materials have the same melt temperature so that the second thermoplastic diffuses into the first thermoplastic when the thermoplastic materials are cured. The diffused second thermoplastic material results in a single diaphragm which has a relatively strong flexing portion 52 that contains only the first material, and a relatively soft sealing portion 54 that has a first thermoplastic base and an upper second thermoplastic lip.

FIG. 4 shows the diaphragm 50 installed into a diaphragm pump 72. The pump 72 has a first outer shell 73 coupled to a second outer shell 74 by bolts 76. Within a first inner cavity 78 of the first outer shell 73 is a wobble plate assembly 80. Attached to the wobble plate assembly 80 are three pistons 82 (only one shown) that move within a corresponding pumping chamber 84 located within a second inner cavity 86 of the second outer shell 74. The pistons 82 are attached to the wobble plate 80 by screws 88 that extend through the apertures 56 of the diaphragm 50. The pressure chambers 84 are coupled to inlet and outlet ports (not shown) of the pump, so that the pumping chamber 84 draws in fluid from the inlet port when the piston 82 moves to an intake position, and the fluid is pushed out of the pumping chamber and through the outlet port when the piston 82 moves to a stroke position. The wobble plate assembly 80 has an output shaft 90 that is coupled to an electric motor (not shown) which rotates the shaft and reciprocates the piston 82 between the intake and stroke positions.

The diaphragm 50 extends across the pump and separates the first inner cavity 78 from the second inner cavity 86. The outer lips 58 and 59 of the diaphragm 50 are captured by the outer shells 73 and 74. The relatively soft second thermoplastic material of the outer lips 58 and 59 are deflected an amount to insure a proper seal around the periphery of the pump. The flexing portion 52 of the diaphragm 50 that is attached to the pistons 82 provides a relatively strong material which can withstand the stress cycles imposed by the operation of the pump. The present invention therefore provides a diaphragm which is both strong and creates an adequate seal for a pump unit.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for constructing a diaphragm, comprising the steps of;

a) introducing an uncured first material with a first shore number into a mold cavity, said first material having a melt temperature;

b) curing said first material;

c) placing said cured first material into a second mold cavity which has an unfilled outer portion;

d) introducing an uncured second material into said outer portion of said second mold cavity, said second material having a melt temperature that is approximately equal to the melt material of said first material and a second shore number which is less than said first shore number, said second material is introduced into said second cavity so that a portion of said first material melts; and, e) curing said second material and said melted first material.

2. The method as recited in claim 1, wherein said second material is introduced to said second mold cavity at a temperature that is greater than a melt temperature of said first material.

3. The method as recited in claim 1, wherein said first and second materials include a common base polymer and said second material contains a larger percentage of a filler elastomer than said first material.

* * * * *